United States Patent [19]

Mueller

[11] 4,149,428
[45] Apr. 17, 1979

[54] HYDRAULIC SHIFT MECHANISM FOR TRANSFER CASE WITH MULTIPLE PATH DRIVE SYSTEM

[76] Inventor: Otto Mueller, 13 Byfield La., Dearborn, Mich. 48120

[21] Appl. No.: 771,397

[22] Filed: Feb. 23, 1977

[51] Int. Cl.² ............................................. F16H 3/08
[52] U.S. Cl. ........................................ 74/364; 74/335
[58] Field of Search ...................... 74/364, 335; 92/65

[56] References Cited

U.S. PATENT DOCUMENTS

| 787,479 | 4/1905 | Tanner | 92/65 |
|---|---|---|---|
| 2,069,526 | 2/1937 | Kesling | 74/364 |
| 2,298,359 | 10/1942 | Ernst et al. | 92/65 |
| 2,306,418 | 12/1942 | Wilson | 74/364 |
| 2,347,882 | 5/1944 | Choate et al. | 74/364 |
| 2,640,374 | 6/1953 | Willis | 74/364 |
| 2,701,477 | 2/1955 | Schoepe | 74/364 |
| 2,728,242 | 12/1955 | DeVlieg | 74/364 |
| 2,928,290 | 3/1960 | Hosea et al. | 74/364 |
| 4,002,105 | 1/1977 | Bell et al. | 92/65 |

*Primary Examiner*—Benjamin W. Wyche
*Assistant Examiner*—Jim Yates
*Attorney, Agent, or Firm*—Olsen and Stephenson

[57] ABSTRACT

Apparatus for a transfer case that has a multiple path drive system including a neutral position, a first drive path of one speed range and a second drive path of a different speed range, the apparatus including (1) a hydraulic cylinder assembly having piston means movable to three positions and a rod connected to the piston means and to a shift mechanism of the transfer case for moving the shift mechanism of the transfer case selectively to one of the three positions of the drive system, and (2) a hydraulic control valve means for selectively controlling from a remote location operation of the hydraulic cylinder assembly.

7 Claims, 10 Drawing Figures

HYDRAULIC SHIFT MECHANISM FOR TRANSFER CASE WITH MULTIPLE PATH DRIVE SYSTEM

BACKGROUND OF THE INVENTION

The present invention relates to hydraulic apparatus for moving to desired positions shift mechanism of a power transmission having a neutral position and a plurality of speed range positions.

More particularly, the present invention is directed to hydraulically operated transmission control apparatus for a transfer case having a two path drive system constructed and arranged to provide a direct drive from the vehicle engine to the drive wheels and a second drive path to provide a second speed range from the vehicle engine to the drive wheels of the vehicle. The invention is not restricted to use only in a two or four wheel drive system, but it is particularly adapted for use with a transfer case adapted for providing two and four wheel drive systems.

Considerable efforts have been made in recent years to improve the drive systems of motor vehicles so as to provide a greater variety of drive systems to meet a greater number of needs that may be encountered by the driver of the vehicle, and there remains a need for improvement over the prior art structures for control apparatus which will allow the driver of the vehicle to shift a multiple speed drive system from one speed to another more readily by hydraulically actuated apparatus.

SUMMARY OF THE INVENTION

The present invention has overcome inadequacies of the prior art and provides hydraulically actuated shift apparatus for a transfer case which has a multiple path drive system; the apparatus being characterized by its simple, effective, and trouble-free operation and its capability of being actuated from a remote location adjacent to the operator of the vehicle.

According to a preferred form of the invention, transmission control apparatus is provided for a transfer case having a multiple path drive system including a neutral position, a first drive path of one speed range, and a second drive path of a different speed range, and a shift mechanism movable to three positions for shifting said drive system respectively to its neutral position or to either one of its drive paths, the transmission control apparatus comprising a hydraulic cylinder assembly having piston means connected to the shift mechanism and movable to any one of three selected axial positions for moving the shift mechanism respectively to one of its three positions, and hydraulic control valve means are provided in communication with the hydraulic cylinder assembly, and the valve means is movable selectively to any one of three positions for directing hydraulic fluid to the hydraulic cylinder assembly for moving the piston means to a corresponding one of its three positions for directing hydraulic fluid to the hydraulic cylinder assembly for moving the piston means to a corresponding one of its three positions. The hydraulic control valve means includes a valve with a rotatable spool for movement to the three positions of the hydraulic control valve means and a flexible cable extending to a location adjacent to the driver's seat of the motor vehicle for turning the spool to any of its three positions so that the hydraulic cylinder assembly can be actuated when desired for movement to any of its three positions, thereby to shift the transfer case to its selected position.

Further unique features of the present invention are the construction and arrangement of the hydraulic cylinder assembly and the hydraulic control valve means, and the arrangement of the cylinder assembly and the valve means to provide the desired results.

Other objects of the invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
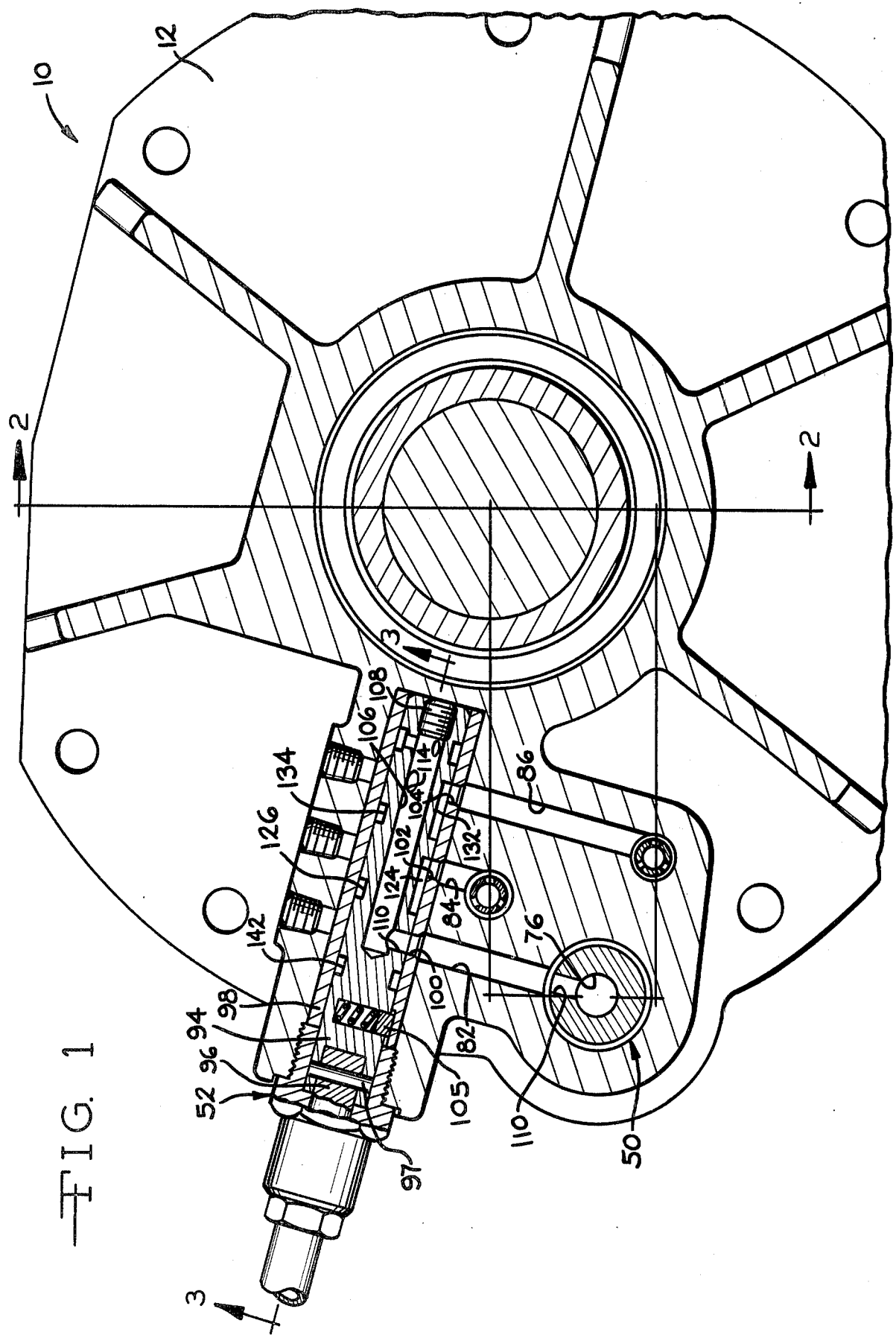
FIG. 1 is a fragmentary end elevational view of a transfer case and showing in section, on the lines 1—1 of FIG. 2, details of the transmission control apparatus embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The torque transfer case 10 includes a housing 12 in which is mounted a conventional power input coupling 14, in the bearing 16, and a power output drive shaft 18 is supported in housing 12 in the conventional manner in the bearing assembly 20. The drive shaft 18 normally will be connected in driving relationship with a pair of drive wheels of a motor vehicle. A sprocket 22 is secured to the shaft 18 by splines to rotate with the shaft 18. The sprocket 22 is adapted to receive a chain drive (not shown) for connection to a second power output drive shaft which can be used to transmit power to a second pair of drive wheels of the vehicle. Forming a part of the housing structure of the transfer case 10 is the housing section 24 which contains bearing 26, also providing support for the shaft 18.

The transfer case 10 includes the multiple path drive system 28, only portions of which are shown, which includes the gear 30 retained in a splined relationship on the power input coupling 14 and the reduction gear 32 supported in splined relationship on the bushing 34 that is supported on shaft 18 for free relative rotation. A needle bearing assembly 36 is disposed between the power input coupling 14 and the power output drive shaft 18 so that free relative rotation of these parts can occur.

A shift collar 38 is mounted on the end of the power output drive shaft 18 for turning therewith, but the collar 38 can be moved axially relative thereto in the usual manner by virtue of the splined connection at 40 between these two components. A clutch ring 42 is mounted on the outer splined portion of the power input coupling 14 for rotation with the coupling 14 and gear 30 so that when the shift collar 38 is moved to the left, as viewed in FIG. 2, a drive connection will be provided from the power input coupling 14 through the gear 30, clutch ring 42, shift collar 38, to the power output drive shaft 18.

A clutch ring 44 is splined on the bushing 34 for rotation with the latter and the gear 32. When the shift collar 38 is moved to the right into clutching engagement with the clutch ring 44, a different speed range drive is provided which extends from the power input coupling 14 through the gear 30, through a conventional gear train (not shown) connecting in driving relationship gear 30 to gear 32, then through clutch ring 44, shift collar 38, to the power output drive shaft 18. For the purpose of shifting the shift collar 38 to either position in engagement with clutch rings 42 or 44 or to the neutral position shown in FIG. 2 in which it is out of engagement with both clutch rings, a shift fork 46 is provided. When the shift fork 46 is in the neutral position shown in FIG. 2, power cannot be transmitted from power input coupling 14 to power output drive shaft 18 because the conventional gear train (not shown) which interconnects gears 30 and 32 will cause turning of gear 32 with power input coupling 14, but the gear 32 will merely turn freely on the shaft 18 without transmitting any power thereto.

The portions of the transfer case 10, described above, form no part of the present invention and conventional components known in the art may be used. The construction and arrangement of the shift mechanism 47, including the shift fork 46, the clutch rings 42 and 44 and the associated shift collar 38 may be conventional structure, or may be that which is disclosed and claimed in U.S. Pat. No. 4,098,381 patented July 4, 1978 in the names of Mueller et al to which reference is made for a more detailed description.

The transmission control apparatus 48 includes the hydraulic cylinder assembly 50 and the hydraulic control valve means 52.

The hydraulic cylinder assembly 50 has a piston means 54 which is connected to the shift mechanism 47 by the piston rod 56, fastening nut 58 and fitting 60. As will be described, the piston means 54 is movable to any one of three selected axial positions for moving the shift mechanism 47 respectively to one of its three positions.

The piston means 54 includes the primary piston 62 and the secondary annular piston 64. The hydraulic cylinder assembly 50 has a primary chamber 66 in which the primary piston 62 can move axially to its three positions, and a secondary chamber 68 axially displaced from the primary chamber and enclosing the piston rod 56 on the other side of the one wall 70 of the primary chamber 68. The secondary annular piston 64 is axially movable on the rod 56 to a limited extent and is adapted to move relative thereto between opposite ends of the secondary chamber 68 during certain phases of operation. The piston rod 56 has a shoulder 72 for engagement with the secondary annular piston 64 to move the latter in one direction toward the primary chamber 66 when the primary piston 62 is being moved in that one direction.

Figure 2:
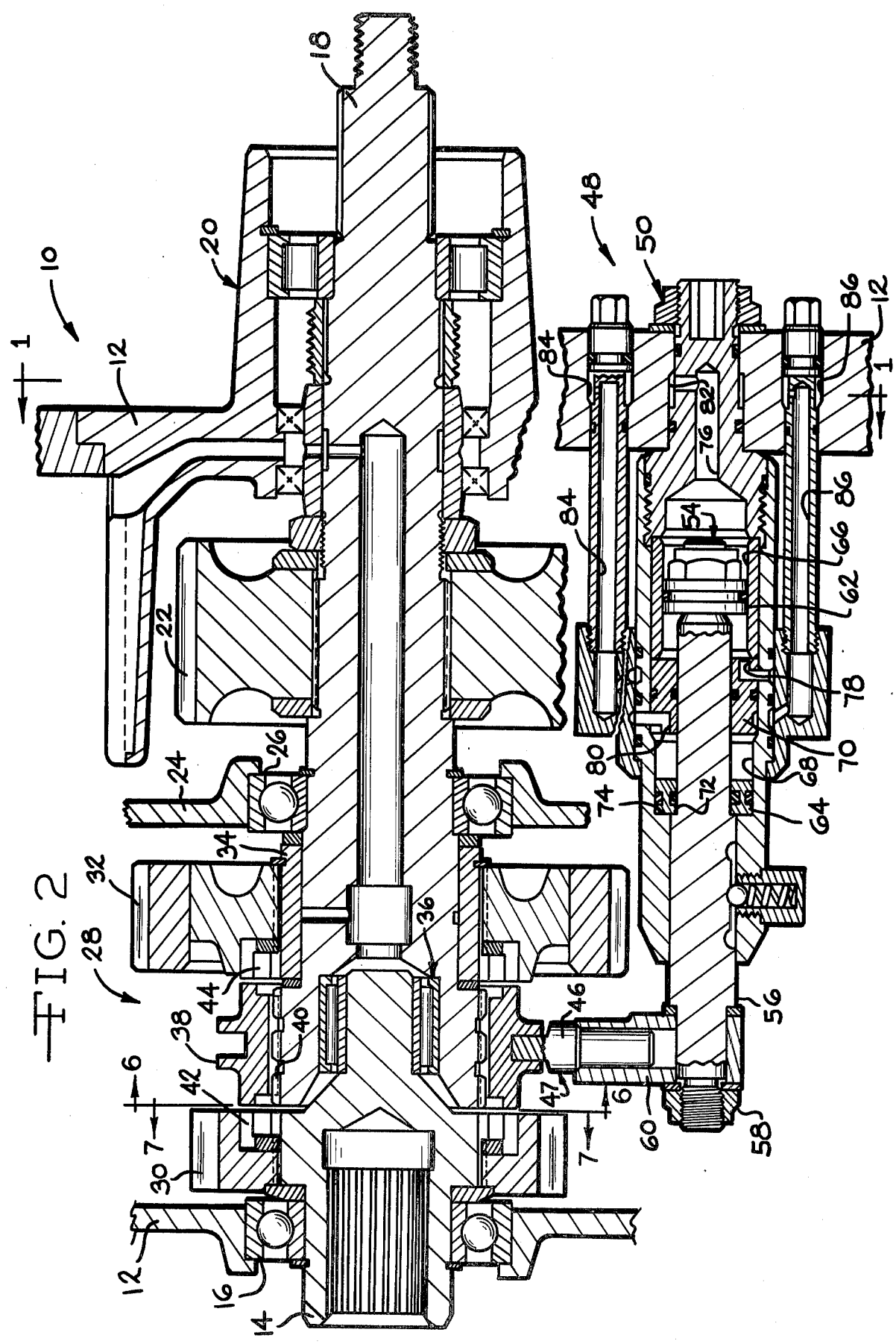
FIG. 2 is a fragmentary vertical section in reduced scale taken on the lines 2—2 of FIG. 1.
Figure 4:
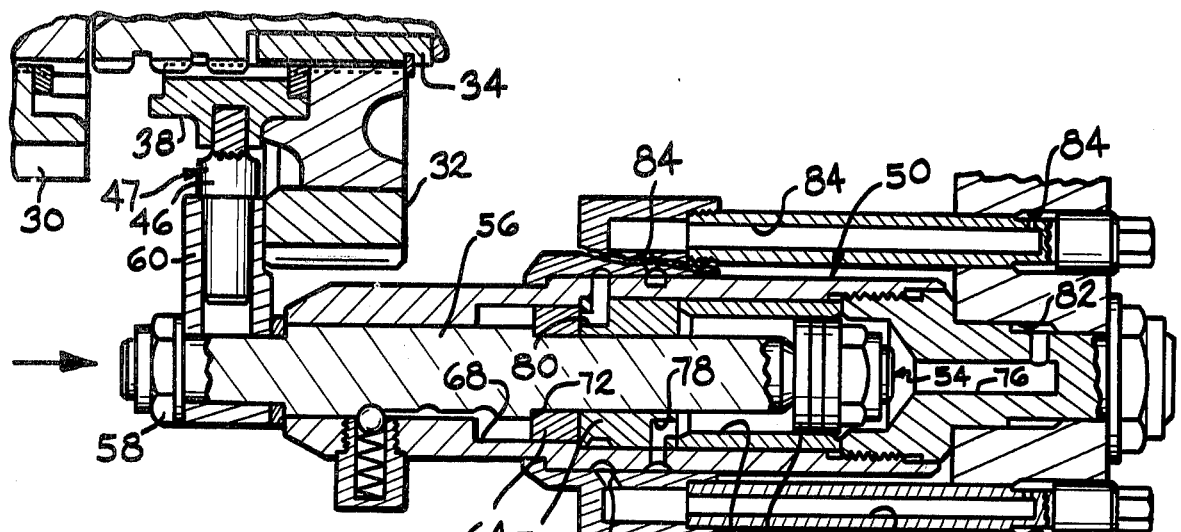
FIG. 4 is a fragmentary vertical section of the hydraulic cylinder assembly, similar to that shown in FIG. 2, but with the hydraulic cylinder assembly in its first or low range drive position.
Figure 5:
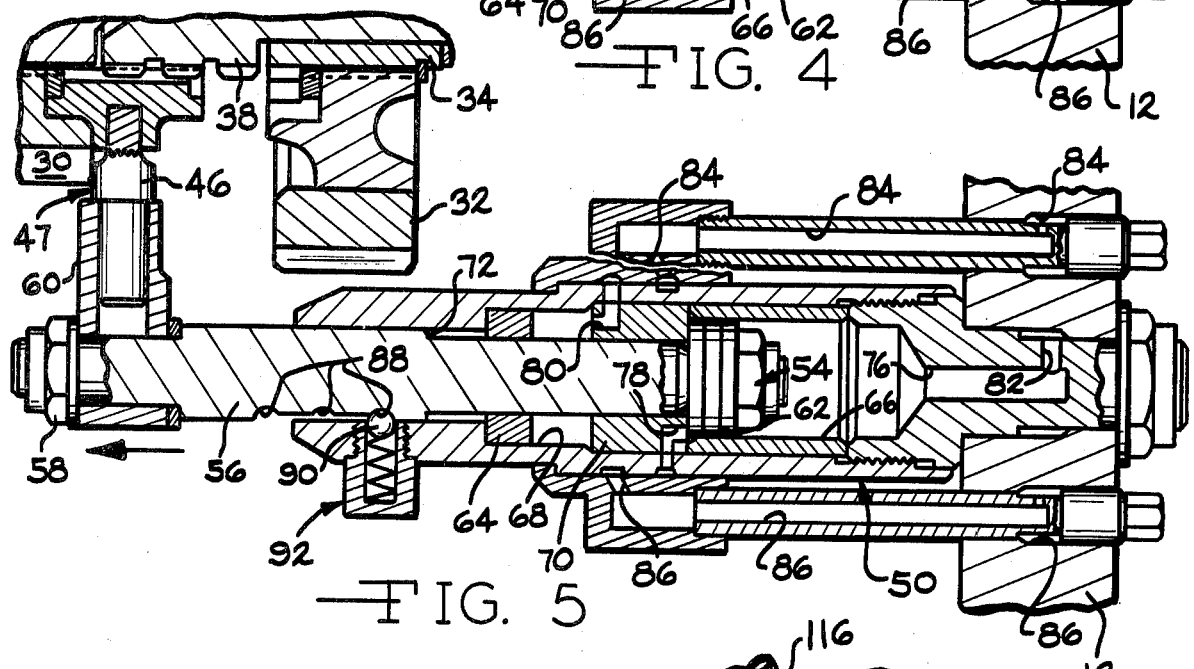
FIG. 5 is a view similar to that of FIG. 4, but showomg the hydraulic cylinder assembly in its second or direct drive range position.

The piston means 54 is in a first position, shown in FIG. 5, when the primary piston 62 is seated against said one wall 70, said piston means 54 is in a second position, shown in FIG. 4, when the primary piston 62 is in a most remote location from the one wall 70 and the secondary annular piston 64 is retained against the one wall 70 by the shoulder 72 of the piston rod 56; and the piston means 54 is in its third position when the primary piston 62 is between its first and second positions, as shown in FIG. 2, at a location wherein the secondary annular piston 64 is seated on the shoulder 72 and against the wall 74 of the secondary chamber 68 that is remote from the one wall 70.

The hydraulic cylinder assembly 50 has a plurality of ports in communication with the primary chamber 66, said ports including port 76 in communication with one end of chamber 66, and port 78 in communication with the other end of chamber 66. The hydraulic cylinder assembly also has the port 80 in communication with the secondary chamber at a location adjacent to the primary chamber, and in the illustrated embodiment in the one wall 70 so that hydraulic fluid under pressure can be discharged between the secondary annular piston 64 and the one wall 70. Similarly, the port 76 is arranged so that pressurized hydraulic fluid can be directed against the primary piston 62 to move it to the left in primary chamber 66, as viewed in FIG. 2, and port 78 is arranged so that pressurized hydraulic fluid can be directed against the primary piston means 62 to move it to the right as viewed in FIG. 2.

Hydraulic fluid passageways 82, 84 and 86 extend respectively between the ports 76, 78 and 80 and the control valve means 52 through which pressurized hydraulic fluid can be directed for moving the piston means 54 selectively to its three positions, corresponding to three positions of the control valve means 50, which will subsequently be described.

As shown in FIGS. 2, 4 and 5, the piston rod 56 has a plurality of sockets 88 in which the ball 90 of the detent means 92 can be seated for each position of the piston means 54.

The control valve means 52 is a rotary valve which has a spool 94 which is rotatable in 120° increments by the cable 96 which is connected thereto by pin 97 and can be arranged to extend to the driving compartment of the motor vehicle, adjacent to the driver's seat, so that the operator of the vehicle can actuate the valve means 52 from a remote location.

The control valve means 52 includes the sleeve 98 in which the spool 94 is rotatable and it has ports 100, 102 and 104 which are in communication respectively with the passageways 82, 84 and 86. A detent means 105 is positioned between spool 94 and sleeve 98 so that the operator can feel when the spool 94 is at one of its three positions of operation.

Figure 3:
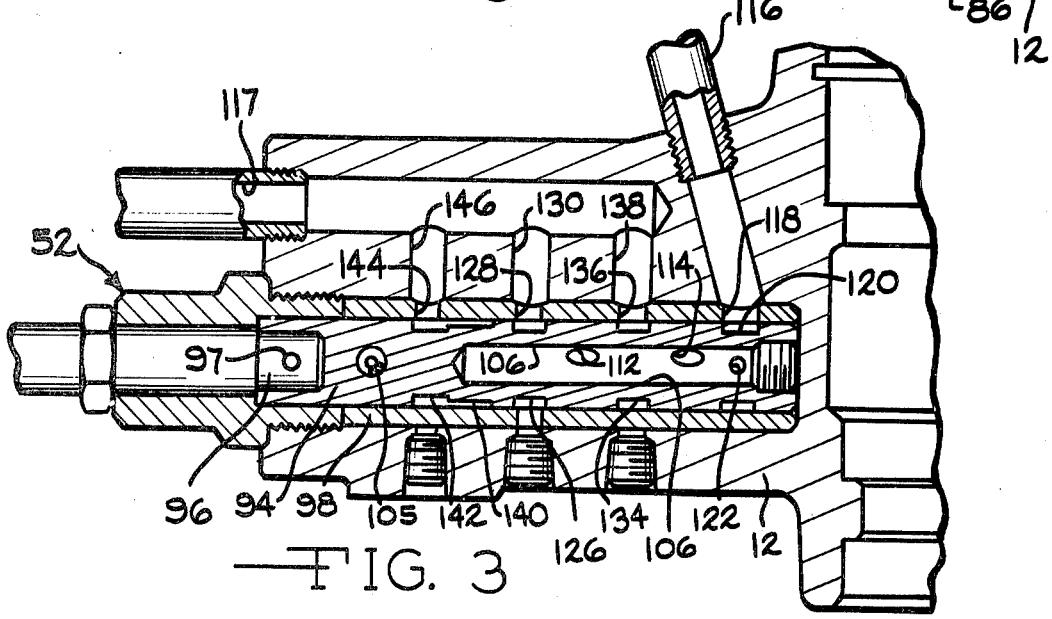
FIG. 3 is a fragmentary section taken on the lines 3—3 of FIG. 1 showing details of construction of the hydraulic control valve means.
Figure 6:
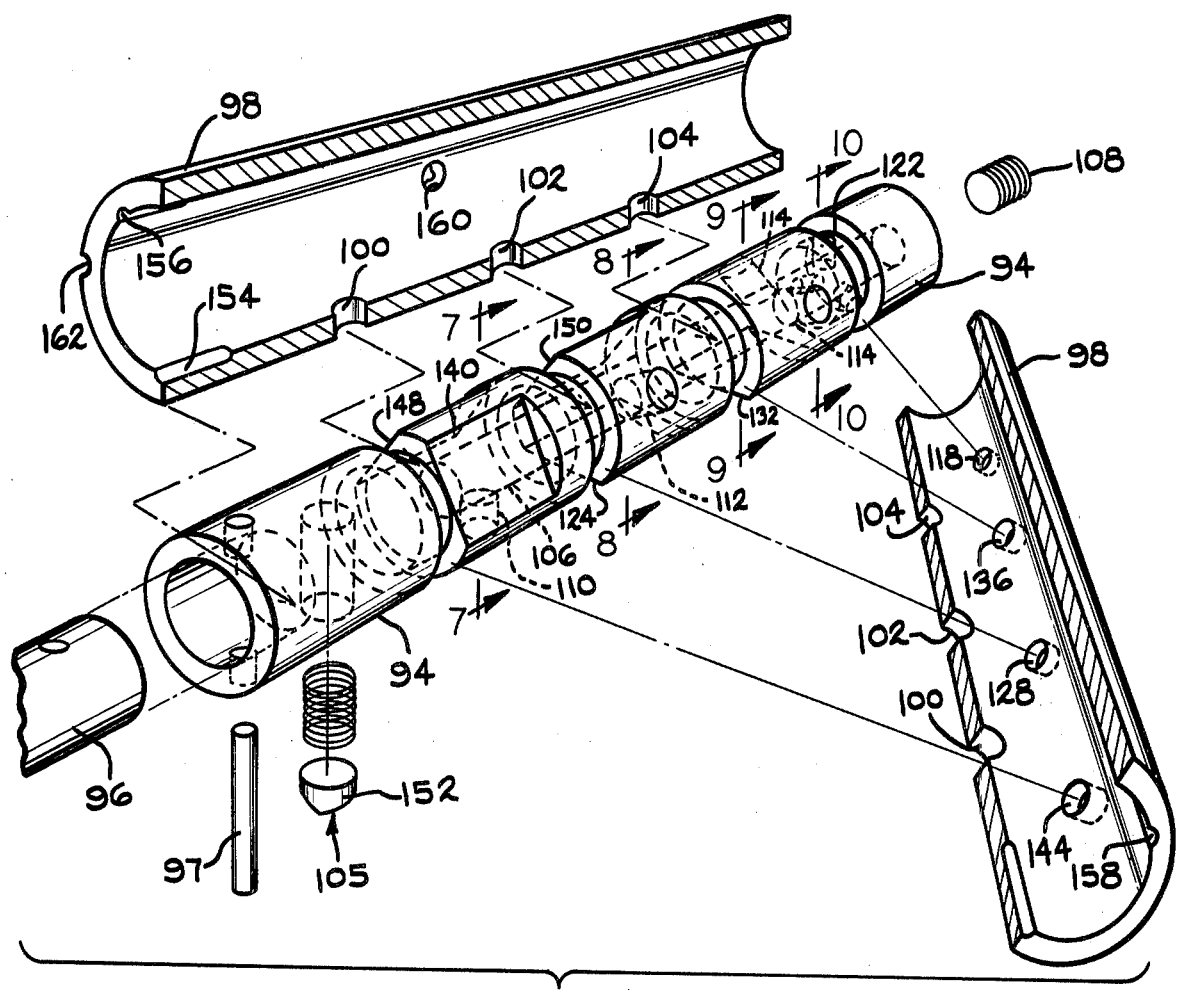
FIG. 6 is an exploded perspective view of the hydraulic control valve means.
Figure 7:
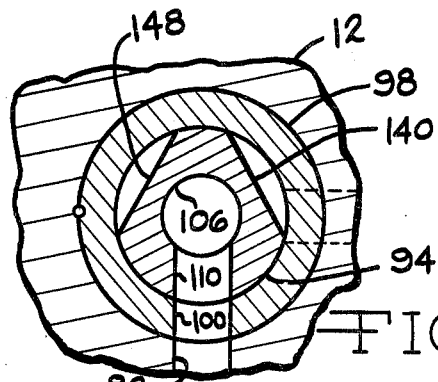
FIGS. 7, 8, 9 and 10 are similar enlarged fragmentary sections taken respectively on the lines 7, 8, 9 and 10 of FIG. 6, showing the valve means in position corresponding to the FIG. 5 position of the hydraulic cylinder assembly.
Figure 8:
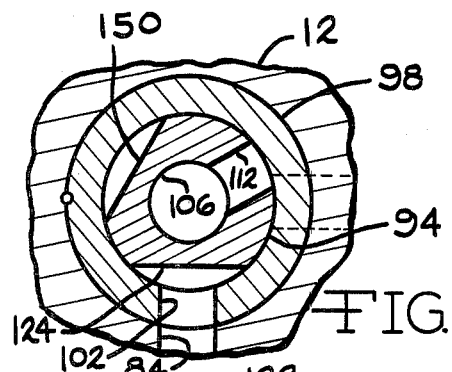
Figure 9:
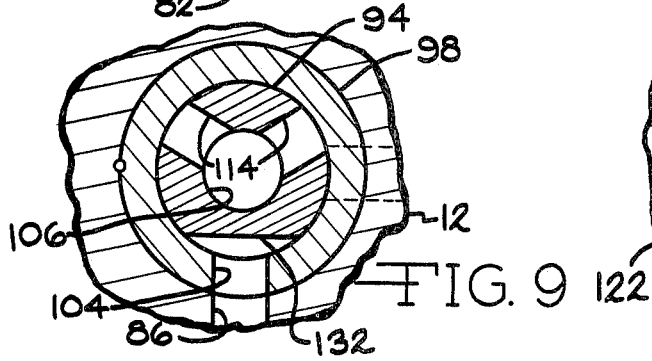
Figure 10:
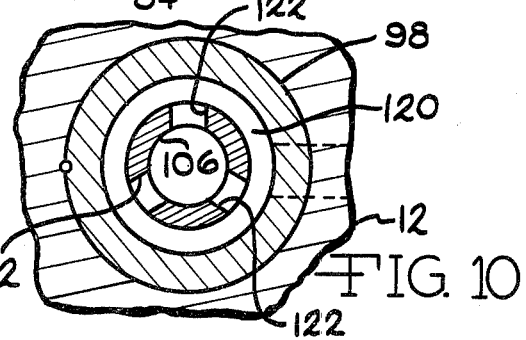

The spool 94 has an axial passageway 106 therein which is closed at the one end by the plug 108 and which has a plurality of radially directed ports 110, 112 and 114 for directing pressurized hydraulic fluid respectively to the passageways 82, 84 or 86 via sleeve ports 100, 102 and 104. Pressurized hydraulic fluid is introduced into the axial passageway 106 through the supply passageway 116, FIG. 3, and hydraulic fluid is returned to tank via the passageway 117.

When the spool 94 is in the position shown in FIGS. 7-10, pressurized fluid can be directed from supply passageway 116 through the port 118 of sleeve 98 to the annular groove 120 of the spool 94 through the ports 122 to the axial passageway 106 and from there via the radial port 110 to the passageway 82 through port 76 into the primary chamber 66 to move the piston means 62 to its position shown in FIG. 5 wherein the shift mechanism 47 will be to the left or to the direct drive position between coupling 14 and drive shaft 18. In the FIG. 7 position of the spool 94 pressurized hydraulic fluid can be supplied only via port 76 to the primary chamber 66, and pressurized hydraulic fluid will be blocked from ports 78 and 80 because of the positions of radially directed ports 112 and 114, shown in FIGS. 8 and 9. Ports 78 and 80 will be in communication with passageway 117 to tank at this position of spool 94. Communication for port 78 is provided via passageway 84, port 102, outer axial passageway 124, annular groove 126, sleeve port 128, and port 130. Communication for port 80 is provided via passageway 86, port 104, outer axial passageway 132, annular groove 134, sleeve port 136, and port 138.

When the spool 94 is turned 120° to its position wherein its radial port 112 is aligned with sleeve port 102 and passageway 84, the hydraulic cylinder assembly 50, upon application of pressurized hydraulic fluid, will be shifted to its neutral position shown in FIG. 2. In this position of operation, pressurized hydraulic fluid can be supplied from passageway 116 through the port 118 of sleeve 98 to the axial passageway 106 and from there via the radial port 112 to the passageway 84 through port 78 into the left end of primary chamber 66, as viewed in FIG. 2. At the same time pressurized hydraulic fluid can be supplied from axial passage 106 through one of radial ports 114 to passageway 86 and to the secondary chamber 68 via port 80. Also, the port 76 at the other end of primary chamber 66 will now be in communication with passageway 117 to tank. This communication is provided via passageway 82, axial passageway 140, annular groove 142, sleeve port 144, port 146 to passageway 117.

When the spool 94 is turned again 120° to its position wherein radial ports 110 and 112 are out of registry with their sleeve ports 100 and 102 and wherein the other of the two radial ports 114 is in registry with its sleeve port 104, the hydraulic cylinder assembly 50, upon application of pressurized hydraulic fluid, will be shifted to its position shown in FIG. 4. In this position of operation pressurized hydraulic fluid can be directed from axial passage 106 through radial port 114, sleeve port 104, passageway 86 to port 78 and then into primary chamber 66. At the same time ports 76 and 80 will be in communication with tank via passageway 117. The communication is similar to that previously described, except axial passageway 148 will be utilized in connection with port 76, and axial passageway 150 will be utilized in connection with port 78.

Thus, it can be seen that to move the hydraulic piston assembly 50 to its FIG. 2 position, or a neutral position, the valve means 52 can be turned to a position so that pressurized hydraulic fluid is directed into secondary chamber 68 and to the primary chamber 66 via port 78 to the left of piston 62, and pressure will be relieved in primary chamber 66 to the right of piston 62 via port 76. Thus, the piston means 54 is moved from either of its drive path positions to its neutral position in response to the pressurized hydraulic fluid acting between the primary piston and the annular piston in opposite directions on these pistons, and by virtue of the larger area of the annular piston 64, the latter will move to the left to its seated position at the remote end of its stroke, as shown in FIG. 2, with the primary piston 62 in a center or neutral position. It it is desired to shift the hydraulic piston assembly 50 to its FIG. 5, or direct drive position, hydraulic pressure will be relieved in secondary chamber 68 and in primary chamber 66 to the left of piston 62 and pressure will be supplied to primary chamber 62 to the right of piston 62. Similarly, if it is desired to shift the hydraulic piston assembly 50 to its FIG. 4 or reduced speed drive, pressurized hydraulic fluid will be directed only to primary chamber 62 on the left of piston 62 while venting will occur from ports 76 and 80. Thus, the piston means 54 is moved from its neutral position to either of its drive positions in response to the pressurized fluid acting only on the side of the piston means tending to move it towards the selected drive path position.

As indicated, detent means 105 will indicate to the operator when the valve means 52 is centered in its three positions. This occurs because spring actuated button 152 will then register in the noches 154, 156 and 158 in sleeve 98. A port 160 and groove 162 are provided in sleeve 98 to vent the opposite ends of spool 94. Port 160 is in communication with passageway 117 to tank.

Pressurized hydraulic fluid can be supplied through supply passageway 116 from any conventional source of hydraulic fluid under pressure in the vehicle.

It is claimed:

1. Transmission control apparatus for a motor vehicle transfer case having a multiple path drive system including a neutral position, a first drive path of one speed range and a second drive path of a different speed range, and a shift mechanism movable to three positions for shifting said drive system respectively to its neutral position or to either one of its drive paths, said transmission control apparatus comprising a hydraulic cylinder assembly having piston means connected to said shift mechanism and movable to any one of three selected axial positions corresponding to said neutral position and said drive path positions for moving said shift mechanism respectively to one of its three positions, and hydraulic control valve means in communication with said hydraulic cylinder assembly and movable selectively to any one of three positions for directing from a source hydraulic fluid under pressure to said hydraulic cylinder assembly and for returning to the source hydraulic fluid at relatively lower pressure for moving said piston means to a corresponding one of its three positions, said hydraulic cylinder assembly and said hydraulic control valve means being arranged (1) so that the piston means is moved from its neutral position to either one of the selected drive path positions in response to the pressurized hydraulic fluid acting only on the side of the piston means tending to move it towards that drive path position in opposition to the pressure of the lower pressure hydraulic fluid on the other side of the piston means and (2) so that said piston means is moved from either of its drive path positions to its neutral position in response to the pressurized hydraulic fluid acting in both directions on the piston means in a manner to center the piston means in the hydraulic cylinder assembly, said piston means including a piston rod connected to said shift mechanism, a primary piston connected to said piston rod, and a secondary annular piston slidably mounted on said piston rod, said piston rod having abutment means to limit the extent of the sliding movement of the annular piston away from the primary piston, said piston means being moved to either selected drive path position when the pressurized hydraulic fluid acts on the opposite side of the piston means causing the primary piston and the annular piston to be urged together towards the drive path position, and the piston means being moved to its neutral position when the pressurized hydraulic fluid acts between the primary piston and annular piston to urge them apart to a position wherein the annular piston is seated at a remote end of its stroke.

2. Transmission control apparatus for a motor vehicle transfer case having a multiple path drive system including a neutral position, a first drive path of one speed range and a second drive path of a different speed range, and a shift mechanism movable to three positions for shifting said drive system respectively to its neutral position or to either one of its drive paths, said transmission control apparatus comprising a hydraulic cylinder assembly having piston means connected to said shift mechanism and movable to any one of three selected axial positions corresponding to said neutral position and said drive path positions for moving said shift mechanism respectively to one of its three positions, and hydraulic control valve means in communication with said hydraulic cylinder assembly and movable selectively to any one of three positions for directing from a source hydraulic fluid under pressure to said hydraulic cylinder assembly and for returning to the source hydraulic fluid at relatively lower pressure for moving said piston means to a corresponding one of its three positions, said hydraulic cylinder assembly and said hydraulic control valve means being arranged (1) so that the piston means is moved from its neutral position to either one of the selected drive path positions in response to the pressurized hydraulic fluid acting only on the side of the piston means tending to move it towards that drive path position in opposition to the pressure of the lower pressure hydraulic fluid on the other side of the piston means and (2) so that said piston means is moved from either of its drive path positions to its neutral position in response to the pressurized hydraulic fluid acting in both directions on the piston means in a manner to center the piston means in the hydraulic cylinder assembly, said piston means including a primary piston and a secondary annular piston, and said hydraulic cylinder assembly having a primary chamber in which said primary piston can move axially to the three positions of said piston means, said primary piston being connected to said shift mechanism by a piston rod extending through one end wall of said primary chamber, a secondary chamber axially displaced from said primary chamber and enclosing said piston rod on the other side of said one wall, said secondary annular piston being axially movable on said rod and adapted to move relative thereto between opposite ends of said secondary chamber, said piston rod having a shoulder for engagement with said secondary annular piston to move the latter in one direction toward said primary chamber when said primary piston is moved in said one direction, said piston means being in a first position when said primary piston is seated against said one wall, said piston means being in a second position when said primary piston is in a most remote location from said one wall and said secondary annular piston is retained against said one wall by said shoulder, and said piston means being in its third position when said primary piston is between its first and second positions at a location wherein said secondary annular piston is seated on said shoulder and against the wall of said secondary chamber that is remote from said one wall.

3. Transmission control apparatus that is defined in claim 2, wherein said hydraulic cylinder assembly has ports in communication with said primary chamber at the opposite ends thereof and a port in communication with said secondary chamber at the end thereof adjacent to said primary chamber, and hydraulic fluid passageways extend between said ports and said control valve means through which hydraulic fluid can be directed for moving said piston means selectively to its three positions corresponding to the three positions of said control valve means.

4. Transmission control apparatus that is defined in claim 3, wherein said control valve means includes a rotary valve which has a spool rotatable in 120° increments to the three positions of the control valve means.

5. Transmission control apparatus that is defined in claim 4, wherein when said spool is in a first position hydraulic fluid under pressure will be directed only to said primary chamber between said primary piston and said one wall, when said spool is in a second position hydraulic fluid under pressure will be directed only to said primary chamber between said primary piston and the other end wall thereof, and when said spool is in a third position hydraulic fluid under pressure will be directed to said primary chamber between said primary piston and said one wall and to said secondary chamber between said secondary annular piston and the end of the secondary chamber adjacent to said primary chamber.

6. Transmission control apparatus that is defined in claim 4, wherein said valve means includes detent means for releasably retaining said spool in place at said 120° increments of rotation.

7. Transmission control apparatus that is defined in claim 4, wherein said spool has an axial passageway therein for receiving hydraulic fluid under pressure and a plurality of radial ports extending between said axial passageway and the outer circumference of said spool, said ports being axially displaced and located in planes containing the axis of the spool and disposed at 120° increments relative to one another, certain of said ports being in communication with certain of said hydraulic fluid passageways for each 120° increment setting of said spool, and at least one port in said spool being continuously in communication with a source of hydraulic fluid adapted to be pressurized so that hydraulic fluid under pressure can be directed to said hydraulic cylinder assembly for moving it to a selected one of its positions.

* * * * *